United States Patent
Ro et al.

(10) Patent No.: US 11,816,021 B1
(45) Date of Patent: Nov. 14, 2023

(54) SYSTEM AND METHOD FOR INTELLIGENT TESTING OF BLOCKCHAIN APPLICATIONS USING A SHADOW SYSTEM

(71) Applicant: Alchemy Insights, Inc., San Francisco, CA (US)

(72) Inventors: Peter Ro, New York, NY (US); Ryan Oblak, Berkeley, CA (US); Elakian Kanakaraj, New York, NY (US); Steven Yang, Milpitas, CA (US)

(73) Assignee: Alchemy Insights, Inc., San Francisco, CA (US)

( * ) Notice: Subject to any disclaimer, the term of this patent is extended or adjusted under 35 U.S.C. 154(b) by 0 days.

(21) Appl. No.: 18/087,746

(22) Filed: Dec. 22, 2022

(51) Int. Cl.
G06F 11/36 (2006.01)

(52) U.S. Cl.
CPC ...... *G06F 11/3664* (2013.01); *G06F 11/3696* (2013.01)

(58) Field of Classification Search
CPC .............. G06F 11/3664; G06F 11/3696
See application file for complete search history.

(56) References Cited

U.S. PATENT DOCUMENTS

| | | | | |
|---|---|---|---|---|
| 5,371,878 A | * | 12/1994 | Coker ................. | G06F 11/3664 714/E11.213 |
| 8,086,732 B1 | | 12/2011 | Volz et al. | |
| 8,554,929 B1 | | 10/2013 | Szeto et al. | |
| 9,613,120 B1 | | 4/2017 | Kharatishvili et al. | |
| 11,281,975 B1 | * | 3/2022 | Isaksson ............. | G06F 11/3664 |
| 11,728,976 B1 | | 8/2023 | Godlove et al. | |
| 11,750,711 B1 | | 9/2023 | Philipson et al. | |

(Continued)

FOREIGN PATENT DOCUMENTS

| | | |
|---|---|---|
| CN | 109992993 A | 7/2019 |
| CN | 112150130 A | 12/2020 |

(Continued)

OTHER PUBLICATIONS

Rohan Koul, "Blockchain Oriented Software testing—Challenges and Approaches", published by IEEE, 2018 3rd International Conference for Convergence in Technology (I2CT), The Gateway Hotel, XION Complex, Wakad Road, Pune, India. Apr. 6-8, 2018, pp. 1-6 (Year: 2018).*

(Continued)

*Primary Examiner* — S. Sough
*Assistant Examiner* — Zheng Wei
(74) *Attorney, Agent, or Firm* — Carr & Ferrell LLP

(57) ABSTRACT

Systems and methods for intelligent and adaptive testing of a blockchain application to identify compliant code modifications. The method includes the steps of recording requests to and response from a baseline blockchain application receiving the requests from a plurality of application users. The same responses are input into a shadow blockchain application that includes a number of switch selectable new code segments. The switch selectable new code is enabled and disabled according to a pattern. The responses from the baseline application are compared against the response from the shadow blockchain application from when error vectors are generated. These error vectors are used to train a learning machine to determine which new code segments result in response errors or aberrations.

20 Claims, 4 Drawing Sheets

(56) References Cited

U.S. PATENT DOCUMENTS

| | | | |
|---|---|---|---|
| 2008/0098349 A1* | 4/2008 | Lin | G06F 11/3664 |
| | | | 717/106 |
| 2010/0293335 A1 | 11/2010 | Muthiah et al. | |
| 2011/0078705 A1 | 3/2011 | Maclinovsky | |
| 2011/0161488 A1 | 6/2011 | Anderson | |
| 2012/0310878 A1 | 12/2012 | Vuksan et al. | |
| 2016/0283348 A1* | 9/2016 | Golde | G06F 11/3664 |
| 2017/0091069 A1* | 3/2017 | Fujiwara | G06F 8/65 |
| 2018/0089041 A1 | 3/2018 | Smith et al. | |
| 2018/0145836 A1 | 5/2018 | Saur et al. | |
| 2018/0198714 A1 | 7/2018 | Krieger | |
| 2018/0300227 A1* | 10/2018 | Bergen | G06F 11/079 |
| 2019/0171451 A1 | 6/2019 | Hardy et al. | |
| 2019/0251018 A1* | 8/2019 | Jin | G06F 11/3692 |
| 2020/0097953 A1 | 3/2020 | Islam et al. | |
| 2020/0183818 A1* | 6/2020 | Guenther | G06F 11/3664 |
| 2020/0233858 A1 | 7/2020 | Deng et al. | |
| 2020/0286026 A1 | 9/2020 | Dahod et al. | |
| 2020/0374113 A1 | 11/2020 | Noam et al. | |
| 2020/0396065 A1 | 12/2020 | Gutierrez-Sheris | |
| 2021/0067319 A1 | 3/2021 | Chung et al. | |
| 2021/0097484 A1 | 4/2021 | Ramos et al. | |
| 2021/0124730 A1 | 4/2021 | Kannan et al. | |
| 2021/0201328 A1 | 7/2021 | Gunther | |
| 2021/0240733 A1 | 8/2021 | Kramer et al. | |
| 2021/0263719 A1* | 8/2021 | Pai | H04L 9/0637 |
| 2021/0272075 A1* | 9/2021 | Adams | G06N 5/046 |
| 2021/0304205 A1* | 9/2021 | Saka | G06Q 20/108 |
| 2021/0314154 A1 | 10/2021 | Husson et al. | |
| 2022/0004539 A1 | 1/2022 | De Caro et al. | |
| 2022/0027348 A1 | 1/2022 | Manevich et al. | |
| 2022/0027970 A1 | 1/2022 | Kim et al. | |
| 2022/0159069 A1 | 5/2022 | Shirley et al. | |
| 2022/0173893 A1 | 6/2022 | Basu et al. | |
| 2022/0318122 A1* | 10/2022 | Hughes | H04L 9/0643 |
| 2022/0335049 A1 | 10/2022 | Hacigumus et al. | |
| 2023/0098185 A1 | 3/2023 | Carver et al. | |

FOREIGN PATENT DOCUMENTS

| | | |
|---|---|---|
| KR | 101796690 B1 | 11/2017 |
| WO | WO2020259352 A1 | 12/2020 |

OTHER PUBLICATIONS

Porru et al., "Blockchain-oriented Software Engineering: Challenges and New Directions", published by IEEE—2017 IEEE/ACM 39th International Conference on Software Engineering Companion (ICSE-C), pp. 1-4 (Year: 2017).*

Hertz, "How to Implement Caching Layers in Web3 Products", Sep. 22, 2022, productcoalition.com, https://productcoalition.com/how-to-implement-caching-layers-in-web3-products-feca245bc5c6, 6 pages.

Wang et al., "Decentralized Caching for Content Delivery Based on blockchain: A Game Theoretic Perspective", Jan. 23, 2018, arxiv.org, https://arxiv.org/pdf/1801.07604.pdf, 6 pages.

Basu et al., "Adaptive TTL-Based Caching for Content Delivery", Dec. 9, 2017, arxiv.org, https://arxiv.org/pdf/1704.04448.pdf, 27 pages.

Cecchet, "Encyclopedia of Database Systems", 2009, Springer, 212 pages.

* cited by examiner

SYSTEM AND METHOD FOR INTELLIGENT TESTING OF BLOCKCHAIN APPLICATIONS USING A SHADOW SYSTEM

CROSS-REFERENCE TO RELATED APPLICATIONS

The present utility patent application is related to U.S. patent application Ser. No. 18/083,421, filed Dec. 16, 2022 entitled "Systems and Methods for Creating a Consistent Blockchain Including Block Commitment Determinations." The present utility patent application is also related to U.S. patent application Ser. No. 18/087,761, filed Dec. 22, 2022 entitled "System and Method for High Performance Providing Fresh NFT Metadata" and U.S. patent application Ser. No. 18/087,732, filed Dec. 22, 2022 entitled "Systems and Methods for Adaptively Rate Limiting Client Service Requests at a Blockchain Service Provider Platform." The contents of each of these above-mentioned applications are incorporated herein by reference for all purposes to the extent that such subject matter is not inconsistent herewith or limiting hereof.

FIELD

The present application relates to computer systems and methods that provide intelligent testing of blockchain applications to identify, limit and detect application programming errors, problems, or aberrations.

BACKGROUND

It should not be assumed that any of the approaches described in this section qualify as prior art merely by virtue of their inclusion in this section.

Blockchain applications interfacing with multiple clients in complex software systems that interface with a variety of blockchain servers can have many nuances making changes and application upgrades difficult to test. Upgrades and new versions of software may cause the application's responses, behavior, and performance to vary. Users of such applications often rely on consistent responses. This can include but is not limited to a consistent format, correct data, and may be sensitive to variances in response times. To test a new version of an application, including a blockchain application, with a client simulator and a source data simulator (various blockchains), is very challenging in that creating all the permutations of all user requests with the possible variations in timing and loading is very difficult and would be very time-consuming to execute. What is needed is a method and system that provides real-world testing of a modified blockchain application against a baseline application operating in a live environment.

SUMMARY

This summary is provided to introduce a selection of concepts in a simplified form that is further described below in the Detailed Description of Example Embodiments. This summary is not intended to identify key features or essential features of the claimed subject matter, nor is it intended to be used as an aid in determining the scope of the claimed subject matter.

According to some embodiments, the present disclosure is directed to a method and system for testing a new version of a blockchain application and adaptively verifying new code segments in a shadow blockchain application against a baseline blockchain application. The adaptive verification identifies which new code segments are generating problematic responses and should not be used in the live application and which new code segments can be used in a live application. The requests from several live users on a number of computers are input into the baseline system and processed by a baseline blockchain application. The baseline blockchain application can have new code segments that are initially disabled through logical switches until verified. These requests are recorded into a first file on a storage medium and can be tagged with additional information, including the time received and the source of the request. The responses of the baseline blockchain application are received and recorded in a second file. The responses can be time-tagged and tagged with client information. The requests can be normalized at the time they are input into the shadow system. The normalizing removes any effects of the request being input to the shadow system at a time offset from when the request was sent to the baseline system.

Next, the requests from the first file, after being normalized, are input into a shadow blockchain application. The shadow blockchain application has a number of shadow logical switches, which enable and disable new code segments during the verification process. The new code segments and shadow logical switches are identical to the logical switches and new code segments in the baseline blockchain application. While the shadow system is processing the recorded or live baseline requests, the shadow switches are enabled and disabled in different sequences and patterns for the purpose of training the learning machine. The shadow responses are recorded and evaluated against the baseline responses to generate error vectors that are used to train a learning machine. The learning machine is trained with the error vectors to generate metrics for each new code segment. After training the learning machine, the output metrics for each of the switchable code segments can be used for a decision on enabling or leaving disabled the corresponding new code segments in the baseline application that were previously disabled. If the metric is below a configurable threshold, indicating few or no discrepancies between the baseline response and the shadow responses, then the new code segment associated with the switch can be enabled in the baseline blockchain application.

BRIEF DESCRIPTION OF THE DRAWINGS

Exemplary embodiments are illustrated by way of example and not limited by the figures of the accompanying drawings, in which like references indicate similar elements.

DETAILED DESCRIPTION OF EXAMPLE EMBODIMENTS

The following detailed description includes references to the accompanying drawings, which are a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, functional, logical, and electrical changes can be made without departing from the scope of what is claimed. The following detailed description is, therefore, not to be taken in a limiting sense, and the scope is defined by the appended claims and their equivalents.

Overview

The following disclosure describes a system for testing a new version of blockchain application software using the request and responses from a system executing a baseline version of a blockchain application. The baseline version of the application can be executed in a live environment with actual clients. Given that there can be many clients utilizing the system, using a copy of the responses in a mirror or shadow system provides realistic real-world testing of the system. The reprocessing of these actual baseline blockchain application requests by the shadow system can provide an efficient approach to testing a new version of the blockchain software application and system.

The requests and responses to and from the baseline blockchain application and system can be recorded for later use in testing a shadow system with the new version of the application. The baseline application is typically operating in a live environment and interfacing with real client computers over the Internet. Alternatively, the requests can be fed substantially concurrently into the new application version. The recording can include timing information to preserve the temporal relationship between application requests.

System Diagrams

Figure 1:
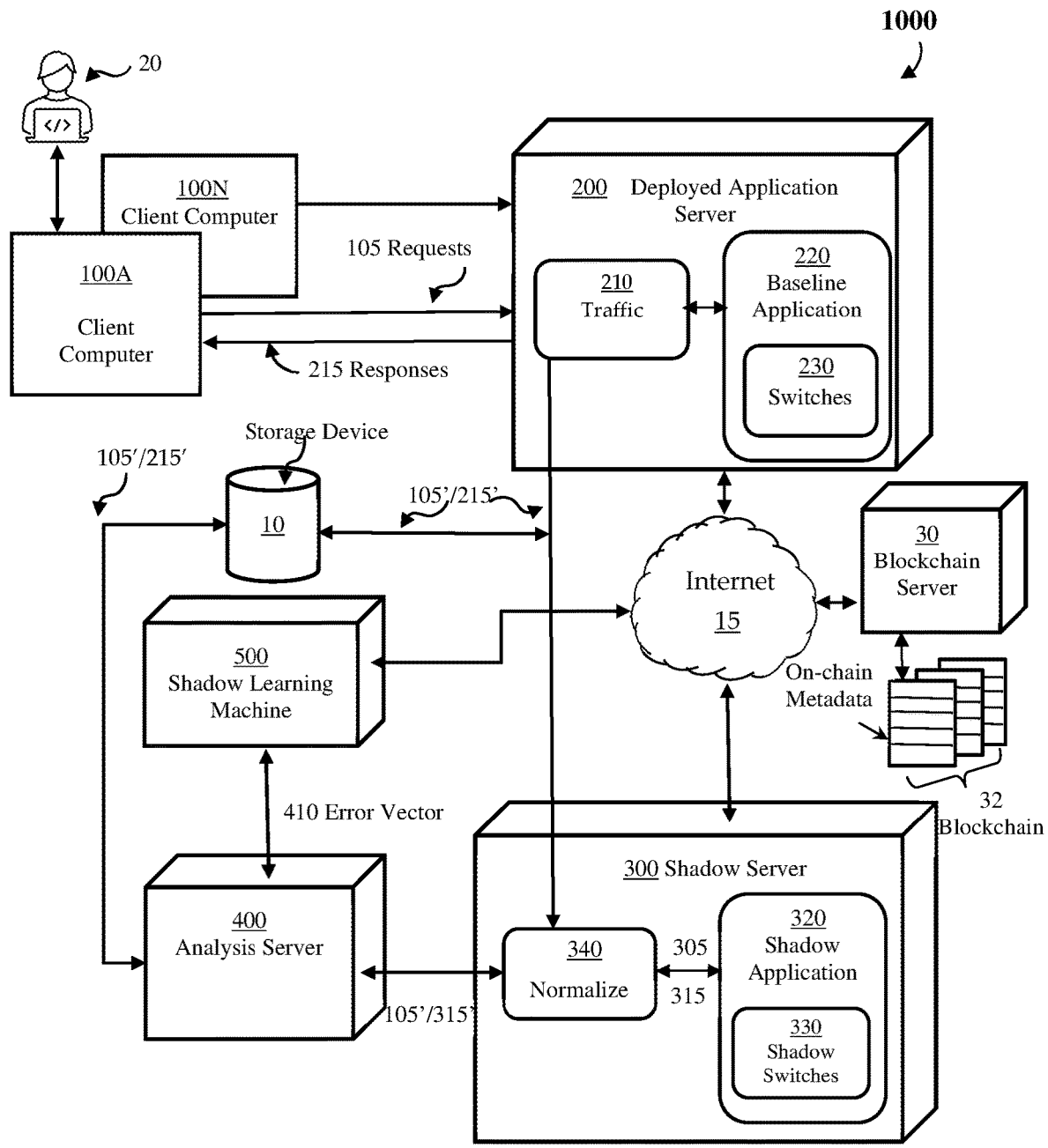
FIG. 1 is a block diagram for automated testing of a new version of a blockchain application and adaptively verifying new code segments in a shadow system.

Referring to FIG. 1, one embodiment of a system diagram 1000 is shown that provides shadow traffic testing of a new software version of a baseline system. The system is comprised of a plurality of client computers 100A-N, a deployed application server (DAS) 200 executing a baseline blockchain application 220, a shadow server 300 executing a new version of the baseline blockchain application (referred to herein as shadow blockchain application 320), an analysis server 400, a shadow learning machine 500, and a blockchain server 30 coupled through the Internet 15. The shadow server 300 responses 315, the baseline blockchain application 220 responses 215, the client requests 105, and the shadow server requests 305 (the requests 105 normalized) are analyzed by the analysis server 400.

The analysis by the analysis server 400 determines differences or errors in the responses and processing behavior and characteristics. Processing behavior and characteristics can include processing time, processing cycles, memory used, and processes generated. These errors and processing characteristics, also referred to as aberrations, can form error vectors for a shadow learning machine 500. Further, the shadow learning machine 500 switch controls 510 can vary the shadow switches 330 settings on the shadow server 300 to learn which new code segment or segments are associated with the response error vectors 410. Further, in one embodiment, the shadow learning machine 500 baseline switch controls 515 the switches component 230, normally disabled, which enable or disable new code segments on the baseline blockchain application. Based on the shadow learning machine 500 training, the identified shadow switches 330 (new code segments) with low or no associated errors.

While many of the connections between the servers are shown as direct connections, these connections can be through networks, including the Internet. And while the servers are shown as separate blocks, these computation devices can be virtual machines or processes executing on the same computational device.

The client computers 100A-N can remotely communicate with the deployed application server 200 through the Internet 15. Requests for services from the deployed application server 200 can be provided through remote procedures call (RPC), but other means are contemplated, including but not limited to a custom Application Programming Interface or other types of messaging inputs. The baseline blockchain application 220 processes a request 105 and sends the corresponding response 215 to the requesting client computers 100A-N.

The deployed application server 200 is any appropriate computational device for the baseline blockchain application 220. Typically, the DAS 200 has the means to communicate with other computational devices over the Internet 15, a local area network, or a wireless network. The DAS 200 includes a baseline blockchain application 220 that provides services to the client computers 100A-N, a manager of traffic component 210, and can include a switches component 230. The DAS 200 may include database applications (not shown) and connections to storage devices 10.

The traffic component 210 can duplicate the requests 105 and responses 215 and send them to a storage device 10 for later input to the shadow server 300. Alternatively, the requests 105 and responses 215 can be sent concurrently to the shadow server 300. Additionally, the traffic component can add information to the requests 105, which is stored as requests 105'. The additional information can include but is not limited to a time tag, client identifier, a client computer identifier, or a combination thereof. The baseline blockchain application 220 responses 215' stored to the storage device 10 can also include tag information as described above.

The benefit of sending the requests 105' directly to the shadow server 300 is that it minimizes any temporal effects of the shadow server 300 making the request at a later time. For example, if any of the variables in the request are indeterminate, then the time stamp of the original request can be used to replace the block number at the time of the of the original request. For example, if a variable was "latest", the variable would be replaced with the value at the time of the original request. If the baseline blockchain application 220 and shadow blockchain application 320 requests data from a blockchain server 30, the blockchain will have grown or been altered as time passes. Further, in some embodiments, the traffic component 210 can be configured to filter the received requests 105 and responses 215 by a specific client. For example, a specific client can be more sensitive to changes or is having specific problems. The shadow blockchain application 320 testing may focus on that client. The traffic component 210 can be a plugin to the network stack, a proxy server, or a process that provides these functions.

The baseline blockchain application 220 is the application that is currently deployed and providing services for the client computers 100A-N. The baseline blockchain application 220 receives requests 105 from the traffic component 210 and sends responses 215 to the traffic component 210. The baseline blockchain application 220 can be connected to the Internet 15 or a local/wide area network to access other resources including but not limited to database services (not shown).

In one embodiment, the baseline blockchain application 220 contains the new code paths found in the shadow blockchain application 320. The switches component 230 can enable the new code paths that are logical configurations that execute the new code when the associated switch is enabled. There can be multiple switches in the switches component 230, which can enable conditional code paths. Further, the new code paths can contain all or some of the new code paths in the shadow blockchain application 320 under evaluation.

The shadow server 300 is comprised of a shadow blockchain application 320, a logical switch (referred to herein as shadow switches 330), and a normalizer 340. The shadow blockchain application 320 provides the same services as the baseline blockchain application 220. Further, the shadow blockchain application 320 can be the same application as the baseline blockchain application 220 but with the new code paths that can be selectively enabled by the shadow switches 330.

The shadow server 300 can receive requests 105' from the traffic component 210, or they can be read from the storage device 10 and sent to the normalizer 340 and the analysis server 400. The normalizer 340 makes any adjustments to the requests 105' to account for temporal differences between when the baseline blockchain application 220 processes the requests 105 and the shadow server 300 processes the same requests at a later time. The blockchain server 30 is an Internet 15 coupled device that manages a blockchain 32 in conjunction with other blockchain servers (not shown).

Shadow Learning Machine

The purpose of the shadow learning machine 500 is to determine which of the new code segments are causing response aberrations between the baseline system deployed application server 200 and the shadow server 300. Aberrations or errors can include but are not limited to response formatting, new response fields, and missing response fields. Further, the aberrations can include behavioral information, including response times for the requests and other resources utilized, including but not limited to memory used, calls to a database, processes created, or a combination thereof.

Figure 2:
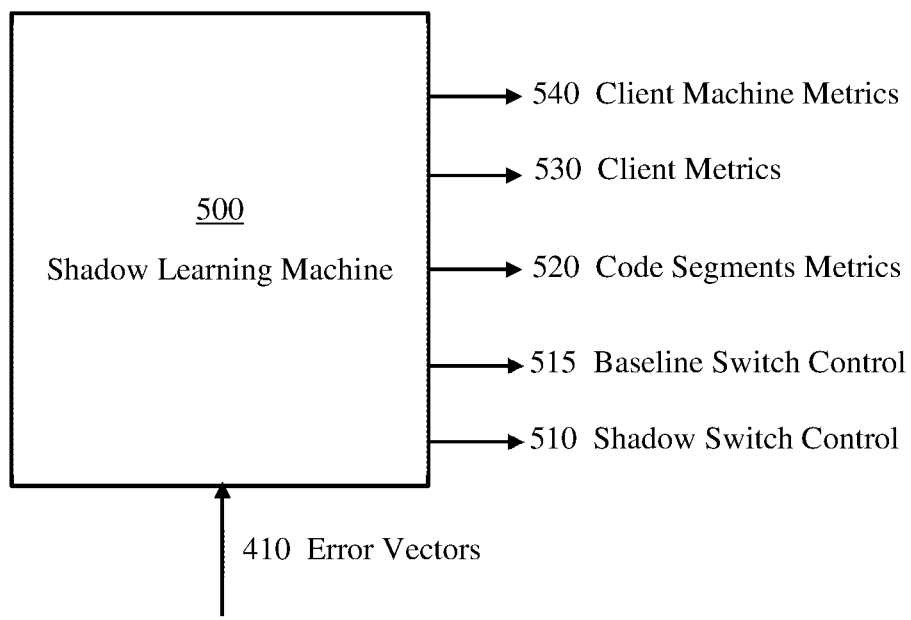
FIG. 2 is a block diagram of one embodiment of adaptive learning, which identifies code segments that have aberrations in the responses.

The shadow learning machine 500 uses error vectors 410 generated by the analysis server 400 while controlling the shadow switches 330 in a manner that trains the shadow learning machine 500 (FIG. 2). The error vectors 410 are received from the analysis server 400 while processing baseline blockchain application responses 215' and shadow blockchain application responses 315' to determine which new code segments are problematic, need further refinement, and should not be used or enabled in the deployed application server 200. In another embodiment, the shadow learning machine 500 includes learning which clients or client machines have errors or aberrations.

A person having ordinary skill in the art (POSITA) of adaptive learning and artificial intelligence programming would know how to select, program, and configure an adaptive learning algorithm for these goals. The algorithm would learn which switch enabled code segments are causing the errors or aberrations. Further, the learning algorithm could learn which clients or client computers have aberrations or errors.

In one embodiment, the analysis server 400 reads the recorded requests 105' and responses 215' from storage device 10. The requests 105' can be sent to the shadow server 300 for processing by the shadow blockchain application 320. The analysis server 400 processes the responses 315 from the shadow blockchain application 320. These responses 315 can be normalized before sending to the analysis server 400.

Referring to FIG. 2, the inputs to the shadow learning machine 500 include an error vector 410 from the analysis server 400. This error vector 410 can include the requesting client information, the requesting client computer 100A-100N (FIG. 1), or a combination thereof. The responses 215 from the baseline blockchain application 220 and the responses 315 from the shadow blockchain application 320 are processed for differences or aberrations and the generation of the error vectors 410.

The shadow learning machine 500 can include control over the shadow switches 330. This control can be sent over any suitable including the Internet 15 or by other communication means. These shadow switches 330 enable and disable code segments in the shadow blockchain application 320. If there are different responses between the baseline blockchain application 220 and the shadow blockchain application 320, the difference may be caused by more than one new code segment controlled by the shadow switches 330. Thus, by varying which code segments are enabled through the shadow switches 330, the shadow learning machine can learn which new code segment is causing an aberration between the baseline system's responses 215 and the shadow system's responses 315.

The outputs of the shadow learning machine 500 can include code segment metrics 520, client metrics 530, and client machine metrics 540. The metrics correspond to the corresponding errors. In one embodiment, each difference that occurs between a baseline response 215 and a shadow response is given a count. There can be different types of aberrations or errors. Each can be given a different weight. For example, a missing field could have a higher weight than the format of a response. The difference can also be that the shadow response took fifty percent longer than the baseline system, and a weight is assigned to this aberration. The response time variance can be from ten percent to five hundred percent. Each code segment metric can have a threshold where that switch selectable code segment is not suitable to be utilized by the baseline blockchain application 220.

The shadow learning machine 500 can include code client metrics 530 and client machine metrics 540. The shadow learning machine 500 could be trained to generate client metrics for each client 20 and client machine metrics 540 for each client computer 100A-N. These metrics would indicate whether a client or a specific client machine would have problems with the new code segments.

Testing Method

Figure 3:
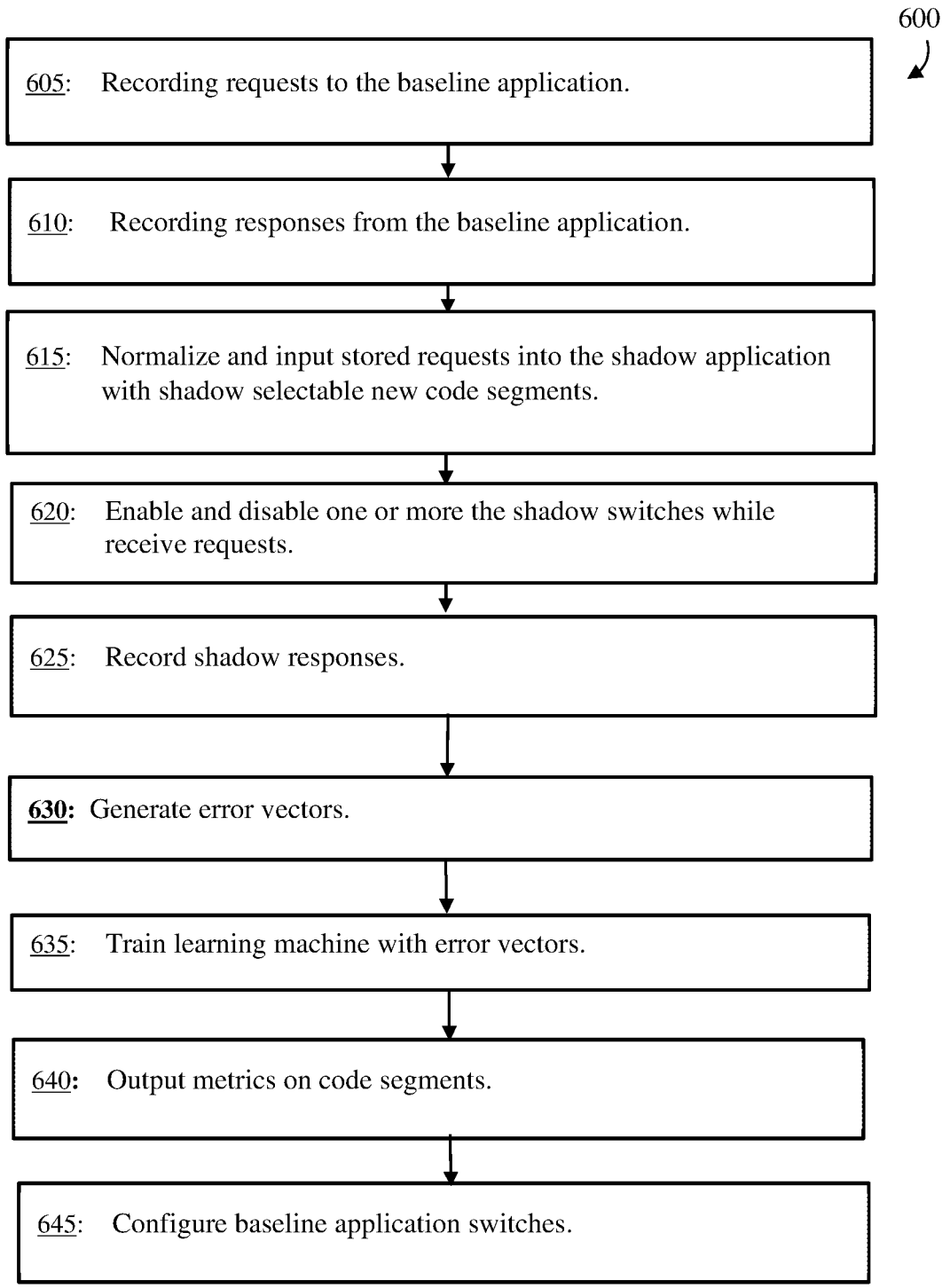
FIG. 3 is a flow diagram of automated testing of a new version of a blockchain application and adaptively verifying new code segments.

Referring to FIG. 3, a flowchart of a method 600 for testing a shadow blockchain application against a baseline version of the application is shown and described. The shadow blockchain application includes switch controllable new application code. The method includes an adaptive technique to learn which code segments may cause errors or aberrations in the response that may be problematic for the client system sending the request.

In step 605, requests sent to the baseline system for the baseline blockchain application are recorded. The recording can be sent to any suitable storage device, including network-attached storage, local disk storage, solid-state memory, or a combination thereof. The recording of the requests will need to be accessible by other system components. The requests can be stored with a time tag and information regarding the source of the request. The source information can include but is not limited to the computer sending the request, the client making the request, or both.

In step 610, responses from the baseline blockchain application are recorded. The recording can be sent to any suitable storage device, including network-attached storage, local disk storage, solid-state memory, or a combination thereof. The recording of the responses will also need to be accessible by other system components. The responses can be stored with a time tag.

In step 615, the requests are normalized and input into a shadow blockchain application. The normalization compensates for the differences caused by the time difference between the recording of the request to the first file and the inputting the requests into the shadow blockchain application. Further, the normalization can adjust variables within the request 105' that are indeterminate.

In step 620, the shadow switches are enabled and disabled according to a sequence. This occurs while the shadow blockchain application is receiving the normalized requests from the first file. The sequence can be random, can enable one or more switches at a time, or use a predetermined sequence pattern. The selection of the sequence will preferably train a learning system in a reasonable amount of time.

In step 625, shadow responses are recorded to a third file or database. The recording can be to any suitable memory device, including a storage area network device, disk drive, or solid-state memory.

In step 630, error vectors are generated from the baseline blockchain application response and the shadow blockchain application response. The error vector can be as simple as incrementing a counter if there is a difference. In another embodiment, different types of errors, or aberrations can have different weights.

In step 635, a learning machine is trained with the error vectors. The learning machine can have an output metric for each shadow switch selectable new code segment, the user computer, the user, or a combination thereof.

In step 640, metrics are output for each new code segment associated with each shadow switch. Further, the output can include metrics for a client or client computer. These metrics can be output for user viewing. In another embodiment, the metrics are used in decisions to enable code segments on the baseline blockchain application.

In step 645, the baseline switches are configured based on the learning machine metrics for each of the code segments. The switch configurable code segments on the baseline blockchain application match the switch enabled code segments in the shadow blockchain application. However, the initial state of the baseline blockchain application switch enabled code segments are disabled. In one embodiment, if the metrics for the code segment are below a threshold, then the code segment on the shadow blockchain application can be enabled. The threshold can be zero indicating no errors or be a percentage such as less than one in a thousand.

While this method is directed to a blockchain application, it could be used to test other types of applications.

Computer System

Figure 4:
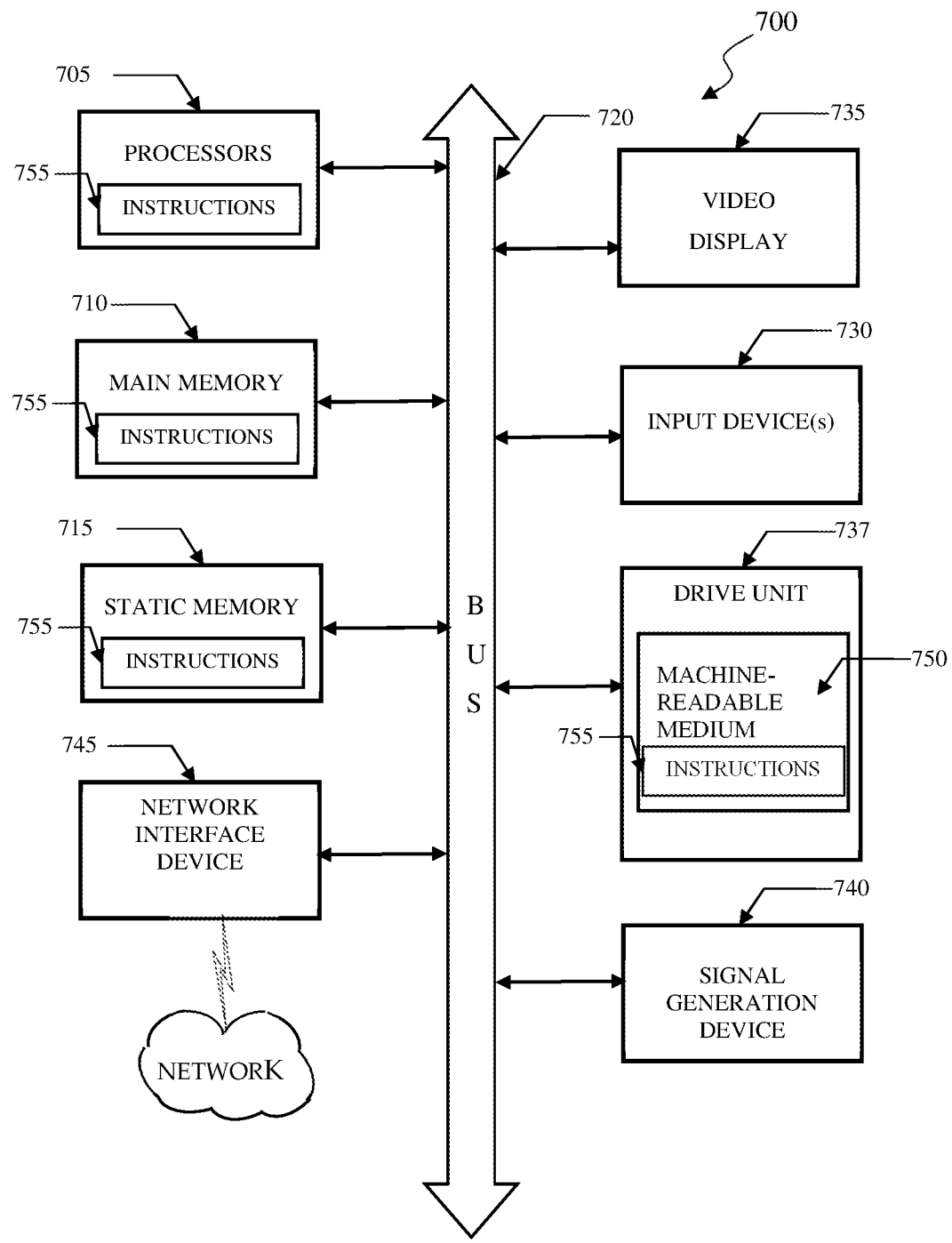
FIG. 4 is a simplified block diagram of a computing system in accordance with some embodiments.

FIG. 4 is a diagrammatic representation of an example machine in the form of a computer system 700, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment or as a peer machine in a peer-to-peer (or distributed) network environment. The machine may be, for example, a base station, a personal computer (PC), a tablet PC, a set-top box (STB), a personal digital assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor or multiple processors 705 (e.g., a central processing unit (CPU), a graphics processing unit (GPU), Digital Signal Processor, Neural Processor Unit (NPU) or any combination thereof), and a main memory 710 and static memory 715, which communicate with each other via a bus 720. The computer system 700 may further include a video display 735 (e.g., a liquid crystal display (LCD)). The computer system 700 may also include an alpha-numeric input device(s) 730 (e.g., a keyboard), a cursor control device (e.g., a mouse), a voice recognition or biometric verification unit (not shown), a drive unit 737 (also referred to as disk drive unit), a signal generation device 740 (e.g., a speaker), and a network interface device 745. The computer system 700 may further include a data encryption module (not shown) to encrypt data.

The drive unit 737 includes a computer or machine-readable medium 750 on which is stored one or more sets of instructions and data structures (e.g., instructions 755) embodying or utilizing any one or more of the methodologies or functions described herein. The instructions 755 may also reside, completely or at least partially, within the main memory 710 and/or within static memory 715 and/or within the processors 705 during execution thereof by the computer system 700. The main memory 710, static memory 715, and the processors 705 may also constitute machine-readable media.

The instructions 755 may further be transmitted or received over a network via the network interface device 745 utilizing any one of a number of well-known transfer protocols (e.g., Hyper Text Transfer Protocol (HTTP)). While the machine-readable medium 750 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read-only memory (ROM), and the like. The example embodiments described herein may be implemented in an operating environment comprising software installed on a computer, in hardware, or in a combination of software and hardware.

Not all components of the computer system 700 are required and thus portions of the computer system 700 can be removed if not needed, such as Input/Output (I/O) devices (e.g., input device(s) 730). One skilled in the art will recognize that the Internet service may be configured to provide Internet access to one or more computing devices that are coupled to the Internet service and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams can be implemented by computer program instructions. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture, including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present technology. In this regard, each block in the flowchart or block diagrams may represent a module, section, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or combinations of special purpose hardware and computer instructions.

In the following description, for purposes of explanation and not limitation, specific details are set forth, such as particular embodiments, procedures, techniques, etc., in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms, and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted that the terms "coupled," "connected," "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only and are not drawn to scale.

If any disclosures are incorporated herein by reference and such incorporated disclosures conflict in part and/or in whole with the present disclosure, then to the extent of conflict, and/or broader disclosure, and/or a broader definition of terms, the present disclosure controls. If such incorporated disclosures conflict in part and/or in whole with one another, then to the extent of conflict, the later-dated disclosure controls.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method for intelligent and adaptive testing of a baseline blockchain application to identify compliant code modifications comprising:
   recording a first file comprising a plurality of requests, each request including a time of receipt, the plurality of requests being input to the baseline blockchain application on a baseline system, the baseline blockchain application including a plurality of baseline switches for selectively enabling and disabling each selectable new code segment, the plurality of baseline switches initially being disabled;
   recording a second file of a plurality of responses, the plurality of responses corresponding to the plurality of requests previously input into the baseline blockchain application;
   inputting the plurality of requests from the first file, after normalization, into a shadow blockchain application in a shadow system, the shadow blockchain application having a duplicate plurality of shadow switches corresponding to the plurality of baseline switches in the baseline blockchain application, the shadow switches selectively enabling and disabling each shadow switch selectable new code segment and the normalization compensating for temporal differences between the recording of the first file of requests input to the baseline blockchain application and the inputting of the first file of requests into the shadow blockchain application;
   enabling the plurality of shadow switches according to one of a predetermined or randomized sequence during the inputting of the plurality of requests, thereby enabling and disabling different new code segments, the predetermined or random sequence being used to train a learning machine;
   recording to a third file, shadow responses, the shadow responses corresponding to the inputting of the plurality of requests to the shadow system;
   generating error vectors of differences between the second file of responses and the third file of shadow responses;
   training the learning machine with the error vectors to generate an output metric for each of a plurality of switch selectable new code segments; and
   enabling the plurality of baseline switches for the plurality of switch selectable new code segments in the baseline blockchain application having a corresponding output metric below a configurable threshold indicating an acceptable level of error vectors between the first file of responses and the second file of responses.

2. The method of claim 1, wherein the recording of the first file of requests, the recording of the second file of responses and/or the third file of shadow responses only includes requests and responses from a single client.

3. The method of claim 1, wherein the sequence is a random selection of the shadow switches.

4. The method of claim 1, wherein the sequence is a single shadow switch enabled at one time.

5. The method of claim 1, wherein the sequence uses a sequence of prespecified shadow switch patterns.

6. The method of claim 1, wherein the error vectors include response processing time variances between the baseline system and the shadow system.

7. The method of claim 1, wherein the requests are from a plurality of application users.

8. A system for intelligent and adaptive testing of a baseline blockchain application to identify compliant code modifications comprising:
   a processing system including a processor;
   a memory communicatively coupled to the processor, the memory storing instructions executable by the processor to perform a method comprising:
   recording a first file comprising a plurality of requests, each request including a time of receipt, the plurality of requests being input to the baseline blockchain application on a baseline system, the baseline blockchain application including a plurality of baseline switches for selectively enabling and disabling each selectable new code segment, the plurality of baseline switches initially being disabled;
   recording a second file of a plurality of responses, the plurality of responses corresponding to the requests previously input into the baseline blockchain application;
   inputting the plurality of requests from the first file, after normalization, into a shadow blockchain application in a shadow system, the shadow blockchain application having a duplicate plurality of shadow switches corresponding to the plurality of baseline switches in the baseline blockchain application, the shadow switches selectively enabling and disabling each shadow switch selectable new code segment and the normalization compensating for temporal differences between the recording of the first file of requests input to the baseline blockchain application and the inputting of the first file of requests into the shadow blockchain application;

enabling the plurality of shadow switches according to one of a predetermined or randomized sequence during the inputting of the plurality of requests, thereby enabling and disabling different new code segments, the predetermined or random sequence being used to train a learning machine;

recording to a third file shadow responses, the shadow responses corresponding to the inputting of the plurality of requests to the shadow system;

generating error vectors of differences between the second file of responses and the third file of shadow responses;

training the learning machine with the error vectors to generate an output metric for each of a plurality of switch selectable new code segments; and enabling the plurality of baseline switches for the plurality of switch selectable new code segments in the baseline blockchain application having a corresponding output metric below a configurable threshold indicating an acceptable level of error vectors between the first file of responses and the second file of responses.

9. The system of claim 8, wherein the recording of the first file of requests and the recording of the second file of responses only includes requests and responses from a single client.

10. The method of claim 8, wherein the sequence is a random selection of the shadow switches.

11. The system of claim 8, wherein the sequence is a single shadow switch enabled at one time.

12. The system of claim 8, wherein the sequence uses a sequence of prespecified shadow switch patterns.

13. The system of claim 8, wherein the error vectors include response processing time variances between the baseline system and the shadow system.

14. The system of claim 8, wherein the requests are from a plurality of application users.

15. The system of claim 8, wherein the error vectors include variances between processes generated in the baseline system and the shadow system.

16. The system of claim 8, wherein the baseline system and the shadow system are separate processing systems.

17. A method for intelligent and adaptive testing of a blockchain application to identify compliant code modifications comprising:

recording two or more requests being input to a baseline blockchain application, the baseline blockchain application including a plurality of disabled baseline switches corresponding to the plurality of disabled baseline switches for each of a plurality of switch selectable new code segments, the requests being sent from a plurality of baseline blockchain application users;

recording responses, the responses corresponding to the two or more requests input into the baseline blockchain application;

inputting the two or more requests into a shadow blockchain application in a shadow system having a duplicate plurality of shadow switches for a plurality of shadow switch selectable new code segments;

enabling the plurality of shadow switches according to one of a predetermined or randomized sequence during the inputting of the two or more requests, thereby enabling and disabling different new code segments, the predetermined or randomized sequence being used to train a learning machine;

recording shadow responses from the shadow system, the shadow responses corresponding to the inputting of the two or more requests to the shadow system; generating error vectors of differences between the responses and associated shadow responses;

training the learning machine with the error vectors, the learning machine having an output for each of the plurality of shadow switch selectable new code segments;

generating an output metric for each of the plurality of shadow switch selectable new code segments indicating an association for each of the new code segments with differences; and enabling the plurality of disabled baseline switches based on the output metric being below a threshold.

18. The method of claim 17, wherein the error vectors include response processing time variances between a baseline system and the shadow system.

19. The method of claim 17, wherein the two or more requests are from a plurality of application users.

20. The method of claim 17, wherein the sequence is a random selection of the shadow switches.

\* \* \* \* \*